(12) United States Patent
Ginosatis

(10) Patent No.: US 11,511,528 B2
(45) Date of Patent: Nov. 29, 2022

(54) MULTILAYER CLING FILM AND BOX

(71) Applicant: FLEXOPACK S.A., Koropi (GR)

(72) Inventor: Dimitris Ginosatis, Koropi Attica (GR)

(73) Assignee: FLEXOPACK S.A., Koropi (GR)

( * ) Notice: Subject to any disclaimer, the term of this patent is extended or adjusted under 35 U.S.C. 154(b) by 0 days.

(21) Appl. No.: 16/705,474

(22) Filed: Dec. 6, 2019

(65) Prior Publication Data
US 2020/0180284 A1 Jun. 11, 2020

(30) Foreign Application Priority Data

Dec. 6, 2018 (EP) .................................. 18210821

(51) Int. Cl.
*B32B 27/08* (2006.01)
*B32B 7/12* (2006.01)
(Continued)

(52) U.S. Cl.
CPC ................ *B32B 27/08* (2013.01); *B32B 7/12* (2013.01); *B32B 27/306* (2013.01); *B32B 27/32* (2013.01);
(Continued)

(58) Field of Classification Search
CPC ........... B32B 7/12; B32B 27/08; B32B 27/18; B32B 27/30; B32B 27/302; B32B 27/304;
(Continued)

(56) References Cited

U.S. PATENT DOCUMENTS 1,966,276 A * 7/1934 Armstrong ......... B65D 83/0805
40/514
3,229,812 A * 1/1966 Metzger ............... B65D 85/672
206/396
(Continued)

FOREIGN PATENT DOCUMENTS

CN 101024460 A 8/2007
DE 202004014317 U1 12/2004
(Continued)

OTHER PUBLICATIONS

Extended European Search Report corresponding to European Patent Application No. 19213824.6-1107 dated Jan. 14, 2020.

*Primary Examiner* — Bryon P Gehman
(74) *Attorney, Agent, or Firm* — Jenkins, Wilson, Taylor & Hunt, P.A.

(57) ABSTRACT

A plastic film for cling film application packed in a box, and a box including such a film, are described. The cling film includes a polyolefin such as low-density polyethylene (LDPE), linear low-density polyethylene (LLDPE), metallocene LLDPE, polyolefin plastomer, ethylene vinyl acetate (EVA), ethylene methyl acrylate (EMA), ethylene butyl acrylate (EBA), polypropylene (PP), cyclic olefin copolymer, or combinations thereof; and a polymer with a Young's modulus higher than 500 MPa selected from ethylene vinyl alcohol (EVOH), polyamide, polyester, cyclic olefin copolymer, polypropylene and polylactide (PLA), or combinations thereof. The film includes an inner layer and an outer layer, wherein the outer layer is free of polypropylene. The (Continued)

film is packed in a box which does not include any cutting unit. The film is configured to be manually cut by a user without using any cutting unit.

11 Claims, 1 Drawing Sheet

(51) Int. Cl.
    B32B 27/30       (2006.01)
    B32B 27/32       (2006.01)
    B65D 85/672      (2006.01)
    B65D 85/67       (2006.01)
    B65D 77/00       (2006.01)
    B65D 77/02       (2006.01)

(52) U.S. Cl.
    CPC ............. B65D 77/00 (2013.01); B65D 77/02 (2013.01); B65D 85/67 (2013.01); B65D 85/672 (2013.01); *B32B 2250/05* (2013.01)

(58) Field of Classification Search
    CPC ......... B32B 27/32; B32B 27/34; B32B 27/36; B32B 27/306; C08J 5/18; C08L 83/04; B65D 77/00; B65D 77/02; B65D 85/67; B65D 85/672
    USPC .................................. 428/220; 206/389–416
    See application file for complete search history.

(56) References Cited

U.S. PATENT DOCUMENTS

| 3,458,109 | A * | 7/1969 | Compton | B65D 13/00 229/220 |
| 6,692,805 | B2 * | 2/2004 | Bonke | B32B 27/32 428/40.1 |
| 7,226,655 | B2 * | 6/2007 | Iriya | B32B 27/36 428/220 |
| 7,323,240 | B2 * | 1/2008 | Iriya | B32B 27/08 428/220 |
| 8,129,006 | B2 | 3/2012 | Ginossatis | |
| 8,697,211 | B2 | 4/2014 | Ginosatis | |
| 9,132,956 | B2 | 9/2015 | Wilcoxen et al. | |
| 9,221,646 | B1 * | 12/2015 | Amara | B65H 35/002 |
| 9,290,320 | B2 | 3/2016 | Ginosatis | |
| 9,365,687 | B2 | 6/2016 | Ginosatis | |
| 9,440,788 | B2 | 9/2016 | Ginosatis | |
| 9,604,430 | B2 | 3/2017 | Ginosatis | |
| 9,789,669 | B2 | 10/2017 | Ginosatis | |
| 10,287,094 | B2 | 5/2019 | Ginosatis | |
| 2004/0086667 | A1 * | 5/2004 | Iriya | B32B 27/36 428/34.1 |
| 2006/0159941 | A1 * | 7/2006 | Gini | B32B 27/08 428/476.1 |
| 2008/0003332 | A1 | 1/2008 | Ginosatis | |
| 2008/0274328 | A1 | 11/2008 | Ginosatis | |
| 2008/0305220 | A1 | 12/2008 | Ginosatis | |
| 2009/0176117 | A1 | 7/2009 | Ginosatis | |
| 2009/0191392 | A1 | 7/2009 | Ginosatis | |
| 2009/0263599 | A1 | 10/2009 | Ginosatis | |
| 2010/0028574 | A1 | 2/2010 | Ginosatis | |
| 2010/0034939 | A1 | 2/2010 | Ginosatis | |
| 2011/0159263 | A1 | 6/2011 | Ginosatis | |
| 2012/0219776 | A1 * | 8/2012 | Vignola | B32B 27/302 428/213 |
| 2013/0227916 | A1 | 9/2013 | Ginosatis | |
| 2014/0030462 | A1 * | 1/2014 | Sullivan | B32B 7/12 428/41.3 |
| 2015/0210454 | A1 | 7/2015 | Ginosatis | |
| 2016/0176612 | A1 | 6/2016 | Ginosatis | |
| 2019/0193378 | A1 | 6/2019 | Ginosatis | |
| 2019/0193379 | A1 | 6/2019 | Ginosatis | |
| 2019/0241335 | A1 | 8/2019 | Ginosatis | |

FOREIGN PATENT DOCUMENTS

| EP | 1636029 A1 | 3/2006 |
| EP | 3461634 | 4/2019 |
| EP | 3473433 | 4/2019 |
| WO | WO 02/09940 A2 | 2/2002 |
| WO | WO 2004/110755 | 12/2004 |

* cited by examiner

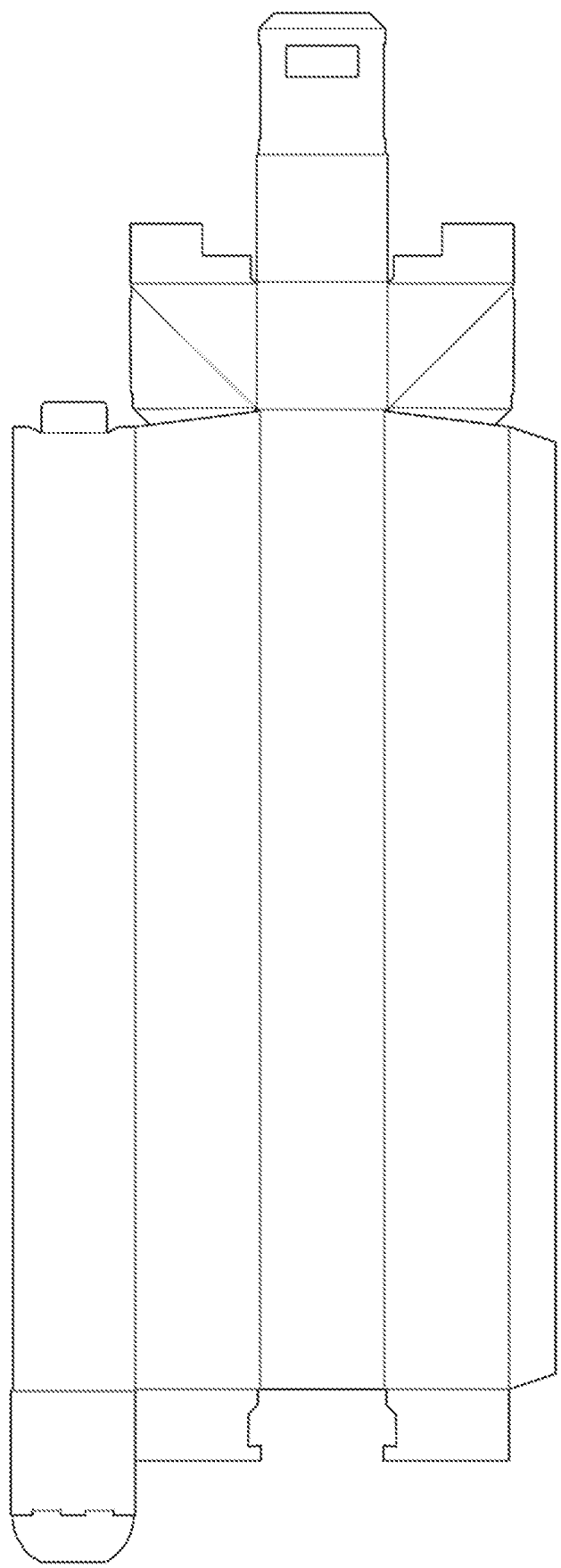

MULTILAYER CLING FILM AND BOX

The present U.S. patent application claims priority to European Patent Application No. 18210821.7, filed Dec. 6, 2018, the disclosure of which is incorporated herein by reference in its entirety.

In the field of plastic film, a very well-known type of film is the so called "cling film" or "kitchen wrap". This film is used by the layman in order to protect ready food from spoilage in everyday kitchen use. Well known films of this type are the Saranex® film in the US and similar films in Europe, Australia and Japan.

This kind of films in order to perform must combine a certain range of properties.
1. The films must have enough adhesiveness in order to cling to plastic kitchen bowls (e.g. Tupperware® type) so that the food stored is protected.
2. They must have enough elongation to be effectively used in practical everyday applications.
3. They must be able to unwind easily during everyday use in the kitchen (films are used in reel form wound around a paper or plastic core).
4. They must be able to be torn efficiently.
5. They must be environmentally friendly and as thin as practically possible.

In the today state of the art, two basic films are used for this application. First one is based on LLDPE (linear low-density polyethylene) while the second is based on PVDC (polyvinylidene chloride). Both have certain advantages and disadvantages.

LLDPE films are economical to manufacture, have enough cling properties and are environmentally friendly. But on the other hand, they do not have odor barrier properties and they are notoriously known for being difficult to cut and difficult to unwind. This type of film is the most common in Europe.

PVDC films are very difficult to produce and are expensive and considered as non-environmentally friendly (due to chlorine presence in PVDC). They have excellent odor barrier and acceptable cling properties.

Sometimes, instead of PVDC a PVC film is used. This solution is not considered viable in many markets due to the phthalate plasticizers used in the production process of soft PVC. In general, the plasticizer migration from the film to the foods and the chlorine content of PVC create a non-environmentally friendly image of the material.

In general, all the above films are packed in boxes before storage at the supermarket. These boxes comprise a cutting unit that allows the user to cut a piece of the film prior to use. This is the case as the films used in the market are quite difficult to cut or tear. The cutting unit may pose safety problems to the user (e.g. elderly, children) and is also cost disadvantageous.

There are many efforts in the prior art to develop cling films of improved functionality and properties. For example, application U.S. Pat. No. 9,132,956 B2 teaches the use of a cling wrap which is produced by a specialized production process. The film is packed in a box and cut by a "cutting strip" used as cutting unit.

There is a lot of prior art and patent literature how the box design and/or cutting mechanism can be more efficient. See for example DE 20 2004 014 317 U1 or CN 101024460 A. However, until now there has been no teaching in the prior art how to avoid the cutting unit. Thereby improving ease of use and minimizing the risk of injury.

PRESENT INVENTION

The present invention describes a plastic film for cling film application, comprising a polyolefin and a polymer with Young's modulus higher than 500 MPa, wherein the film is packed in a box which does not comprise any cutting unit.

Preferably, the box is a carton box.

The cling film described in the present invention preferably has a thickness of less than 25 microns, preferably less than 20 microns, more preferably less than 18 microns, even more preferably less than 17 microns, and even more preferably less than 15 microns.

Preferably, the film is wind up on a reel, preferably made of paper or plastic.

FIGURES

FIG. 1 illustrates a pattern of a box according to the present invention.

DEFINITIONS

In this application the following definitions are used:

The term "film" refers to a flat or tubular flexible structure of thermoplastic material.

The term "heat shrinkable" refers to a film that shrinks at least 10% in at least one of the longitudinal and transverse directions when heated at 90° C. for 4 seconds. The shrinkability is measured in water according to ASTM 2732. For temperatures like 100° C. or more, glycerine is used as a reference liquid.

The term "total heat shrinkability" refers to the sum of heat shrinkability at the MD direction and heat shrinkability at the TD direction. In all cases, ASTM 2732 is used for measurement of shrinkabilities.

The term "multilayer" refers to a film comprising 2 or more layers.

The phrase "longitudinal direction" or "machine direction" herein abbreviated "MD" refers to a direction along the length of the film.

The phrase "outer layer" refers to the film layer which comes in immediate contact with the outside environment (atmosphere). The outer layer in the present invention is a "release layer", i.e. a low- or non-adhesive antistick layer.

The phrase "inner layer" refers to the film layer that comes in direct contact with the product packed.

As used herein, the term "homopolymer" refers to a polymer resulting from polymerization of a single monomer.

As used herein, the term "copolymer" refers to a polymer resulting from polymerization of at least two different polymers.

As used herein, the term "polymer" includes both above types.

As used herein, the term "polyolefin" refers to any polymerized olefin, which can be linear, branched, cyclic, aliphatic, substituted or unsubstituted. More specifically, included in the term polyolefin are homopolymers of olefin, copolymers of olefin, copolymers of an olefin and a non-olefinic comonomer (such as ester) etc.

Specific examples include polyethylene homopolymer, polypropylene homopolymer, polybutene homopolymer, ethylene alpha olefin copolymer, propylene alpha olefin copolymer, butene alpha olefin copolymer, ionomer, ethylene ester copolymer etc.

As used herein the term "polyethylene" identifies polymers consisting essentially of the ethylene repeating unit. The ones that have a density more than 0.940 are called high density polyethylene (HDPE), the ones that are have less than 0.940 are low density polyethylene (LDPE).

As used herein the phrase "ethylene alpha olefin copolymer" refers to polymers like linear low-density polyethylene (LLDPE), medium density polyethylene (MDPE), very low density polyethylene (VLDPE), ultra-low density polyethylene (ULDPE), metallocene catalyzed polymers and polyethylene plastomers and elastomers.

As used herein the term "homogeneous ethylene alpha olefin copolymers" refer to ethylene alpha olefin copolymers having a molecular weight distribution less than 2.7 as measured by GPC. Typical examples of these polymers are AFFINITY® from DOW or Exact® from Exxon.

As used herein the phrase "styrene polymers" refers to styrene homopolymers such as polystyrene and to styrene copolymers such as styrene-butadiene copolymers, styrene-butadiene-styrene copolymers, styrene-isoprene-styrene copolymers, styrene-ethylene-butadiene-styrene copolymers, ethylene-styrene copolymers and the like.

As used herein the phrase "ethylene methacrylate copolymers" refers to copolymers of ethylene and methacrylate monomer. The monomer content is less than 40% per mol.

As used herein the phrase "ethylene vinyl acetate copolymer" or EVA refers to copolymers of ethylene and vinyl acetate.

As used herein the phrase "ethylene ester copolymer" includes any polymer made from ethylene and ester monomers. It is obvious that this term includes EVAs, EMAs and other polymers.

As used herein the term "oxygen barrier polymer" refers to polymers which have the property to limit the passage of oxygen through a film or a layer comprising the polymer. Common materials are EVOH, PVDC or polyamide.

As used herein, the term EVOH refers to saponified products of ethylene vinyl ester copolymers. The ethylene content is typically in the range of 25 to 50% per mol. All the later references to EVOH ethylene content will be in % per mol.

As used herein the term PVDC refers to a vinylidene chloride copolymer wherein a major amount of the copolymer comprises vinylidene chloride and a minor amount of the copolymer comprises one or more monomers such as vinyl chloride and/or alkyl acrylates and methacrylates.

As used herein the term "polyamide" refers to homopolymers and copolymers. Polyamide 6, polyamide 66, polyamide 12, polyamide 6/66, polyamide 6/12, polyamide elastomers, MXD polyamides and other copolymers are specifically useful for the invention.

As used herein the term "polyester" refers to polymers comprising terephthalate units. Examples of polyesters are PET (polyethylene terephthalate), PBT (polybutylene terephthalate), polyester elastomer (block copolymer comprising ester or ether units), PTT and other similar polymers.

As used herein, the term "ionomer" comprises the copolymers of ethylene and methacrylic or acrylic acid being metal neutralized. An example of such material is Surlyn® from Dupont.

As used herein, the term "polypropylene" refers to polymers incorporating propylene structural units. Examples of these, are homo polypropylenes, random copolymers of propylene and ethylene, block copolymers of propylene and ethylene, copolymers or blends of propylene and rubber (such as blends of polypropylene and ethylene propylene rubber), propylene ethylene alpha olefin terpolymers and others.

These polymers may be isotactic, syndiotactic or atactic. Isotactic configuration is preferred.

As used herein the term "self-adhesive material" refers to materials that when produced into film form can be bonded to themselves by pressure only without the need to be heated. The bonding level which separates self-adhesive from non self-adhesive materials is 5 g/15 mm when the bonding has been done on a 100×1500 mm film piece with a pressure of 3 bar under 23° C. temperature and 50% relative humidity and with a contact time of 5 seconds. Values of more than 5 g/15 mm according to this test show that the material is self-adhesive whereas values of lower than 5 g/15 mm show the film being non self-adhesive.

As used herein the term "substantially non-resilient material" refers to materials or material compounds comprising at least 40% per weight inorganics like calcium carbonate, titanium dioxide, wollastonite, mica, glass fibers, dolomite and the like. The rest percentage per weight can be polyethylene, polypropylene, styrene polymer or other thermoplastic material.

As used herein the term "tackifier" refers to low molecular weight materials used to increase the stickiness of the surface of an adhesive. Typical examples are rosins and their derivatives, terpenes and modified terpenes, hydrogenated hydrocarbon resins, C5 aliptatic resins, C9 aromatic resins, C5/C9 resins, terpene/phenol resins and the like.

All measurement methods mentioned herein are readily available for the skilled person. For example, they can be obtained from the American National Standards Institute at: www.webstore.ansi.org All percentages are based on weight per weight ratio, except when otherwise stated. The grs/square meter is same as $g/m^2$. Both are expressing the weight to surface ratio.

DETAILED DESCRIPTION OF THE INVENTION

Film

The cling film of the invention comprises at least a polyolefin and at least a polymer with Young's modulus of at least 500 MPa.

Examples of the polyolefin is low density polyethylene (LDPE), linear low density polyethylene (LLDPE), metallocene LLDPE, polyolefin plastomer, ethylene vinyl acetate (EVA), ethylene methyl acrylate(EMA), ethylene butyl acrylate(EBA), polypropylene(PP), cyclic olefin copolymer and others.

Examples of the polymer with Young's modulus of more than 500 MPa include polyimide, polyester, polypropylene, polylactide (PLA), ethylene vinyl alcohol (EVOH) and others.

Young's modulus is defined as per ISO 527 and is a measure of the stiffness of the material.

The film structure in general terms could be of below options:
Outer layer/Inner Layer
Outer layer/Barrier layer/Inner Layer
Outer layer/Tie layer/Barrier layer/Tie Layer/Inner layer
Outer Layer/Abuse layer/Tie Layer/Barrier Layer/Tie Layer/Abuse Layer/Inner Layer
Inner Layer (Adhesive)

The inner layer comprises an adhesive material.

In a further preferred embodiment, the weight of the inner layer is less than 6 $g/m^2$, more preferably less than 5 $g/m^2$.

In a preferred embodiment, the adhesive material comprises ethylene vinyl acetate copolymer where the vinyl acetate weight ratio is at least 20%, more preferably at least 25%, even more preferably at least 25%, even more preferably at least 40%.

In another preferred embodiment the adhesive material is a propylene ethylene copolymer where the ethylene content is at least 10% per weight.

In another preferred embodiment the adhesive material comprises an ethylene alpha olefin copolymer with density less than 0.9 g/cm$^3$, even more preferably less than 0.880 g/m$^3$. Preferred alpha olefins are butene, hexene or octene.

In another preferred embodiment, the adhesive material comprises a maleic anhydrite grafted polyolefin. Examples are maleic anhydrite grafted ethylene vinyl acetate copolymer of linear low-density polyethylene.

In another preferred embodiment, the adhesive material comprises styrene copolymers with styrene content less than 50% per weight. Typical examples are styrene butadiene styrene copolymers, styrene isoprene styrene copolymers, styrene ethylene butadiene copolymers and the like.

In another preferred embodiment, the adhesive material comprises ethylene methyl acrylate copolymer with a methyl acrylate content of at least 20% by weight. In another preferred embodiment, the adhesive material comprises ethylene butyl acrylate material with a butyl acrylate content of at least 15% by weight.

In another preferred embodiment, the adhesive material comprises poly-isobutylene polymer (PIB) or polybutene copolymer.

The inner layer may comprise also non self-adhesive materials such as polyolefins (preferably polyethylene homopolymers or copolymers) but not to the extent that the adhesive properties are compromised.

In another embodiment, the inner layer may comprise tackifiers such as hydrocarbon resins, terpene resins, rosins and the like. Typical examples are Escorez® materials from Exxon.

In a further preferred embodiment, the inner layer may additionally comprise materials such as "substantially non-resilient materials" (SNR). See the above definition of this term.

In a preferred embodiment of the invention, the adhesive material in the inner layer is an extrudable material, meaning that it is melt processed by extrusion process.

Outer Layer (Release Layer)

As defined above, the phrase "outer layer" refers to the film layer that comes in direct contact with the environment.

Preferred materials for the outer layer include polyolefins, such as low-density polyethylene, high density polyethylene, ethylene ester copolymer, ethylene alpha olefin copolymer and polypropylene. Ionomers and styrene copolymers are also possible. Ethylene alpha olefin copolymer is particularly preferred.

According to a preferred embodiment the outer layer comprises additionally a "substantially non-resilient material" (SNR).

In a preferred embodiment of the invention, the SNR material is at least 10 percent, preferably at least 20, preferably at least 30 percent per weight of the outer layer.

In a preferred embodiment the outer layer comprises at least one release agent that is a polymer or chemical substance that allows the surface tension of the outer side to decrease. The reason for this is to allow the easy unwinding of the reel when the inner and the outer side come in contact one to the other. Preferred release agents are organic lubricants (such as erucamide or oleamide) and silicone or siloxane based lubricants.

In a preferred embodiment the release layer comprises at least 200 ppm of an amide based lubricant. Typical amide based lubricants are erucamide, oleamide, stearamide, oleyl palmitamide, behenamide and the like. In a more preferred embodiment, the release layer comprises at least 500 ppm of an amide based lubricant as of above.

Tie Layers

In the tie layers typical adhesive resins like maleic anhydride modified polyolefins may be used. Typical examples are BYNEL® from Dupont and OREVAC® from Arkema.

In another preferred embodiment the tie layers comprise low density polyethylene, linear low-density polyethylene, ethylene ester copolymers such as EVA, EMA or EBA and other polyolefin homopolymers, copolymers and terpolymers.

In another preferred embodiment of the invention, polyamide could be used as tie layer.

In that case a tie layer is needed between polyamide and polyolefins.

Abuse Layers

In the abuse layers the use of polyolefin homopolymers and/or copolymers is preferred. Polyamide, polystyrene and polyester is also possible.

Barrier Layer(s)

In the optional barrier layer(s) materials like EVOH and polyamide are preferred. The functionality of this layer is to not allow oxygen ingress into the pack, therefore protecting the quality of the packed unit(eg food).

General

The preferred production method for the film is the hot blown film method, which is well known in the art. Other methods like extrusion through flat cast die are also possible.

Additives well known in the art may be used in one or more layers of the present invention. Slip additives, antiblock additives, antifog, polymer processing aids may be used if pertinent.

In order to increase the mechanical properties, the film may be crosslinked with one of the following methods E-beam radiation, gamma radiation, moisture crosslinking using silane grafting compounds, peroxide crosslinking.

The film may be in tubular form or sealed at the edges or single sheet configuration. Centerfold configuration is also possible.

Box

Further a box is provided which does not comprise a cutting unit. Preferably the box is made from carton.

The box opening design may comprise the below different possibilities:

The box opens by opening the specially modified smallest surface dimension (see FIG. 1). The closing mechanism may be flip-flap (=a small paper extension enters a pocket thus allowing a secure closure). In this case the reel of film is removed as a whole to be further used, The box opens by tearing the carton alongside the bigger dimension so that the film may be unrolled directly or the reel can be removed as a whole and put elsewhere.

The box can be used to store the film as disclosed above.

Thus, in one embodiment a box as described above is provided including a film as described above, stored therein.

The film as described above, can be used to be stored in a box as described above.

Thus, in one embodiment a film as described above is provided packed in a box as described above.

EXAMPLES

Example 1

Film

A 5-layer film is produced in a commercial hot blown film line with the following recipe:

Outer layer 75% EAO1+15% SNR1+10% slip antiblock masterbatch

Tie layer Adhesive tie layer maleic anhydride grafted LLDPE
Barrier layer EVOH 27% mol
Tie layer Adhesive tie layer maleic anhydride grafted LLDPE
Inner layer Polypropylene plastomeric adhesive material
See table 1
The thickness (in microns) of the structure is 5/1.5/1.5/1.5/3 starting from the inner and going to the outer layer.
EVOH 27% mol has a Young's modulus of about 4000 MPa measured as per ISO 527.

TABLE 1

| Type | Description | Density g/cm³ |
|------|-------------|---------------|
| EAO1 | Ethylene octene copolymer (LLDPE) | 0.92 |
| SNR1 | Calcium carbonate compound | 1.6 |

The slip antiblock masterbatch comprises 5% of erucamide, 10% silica and the balance LDPE.
Box
A box based on a pattern as illustrated in FIG. 1 was produced.
A 30 meter reel of the film was put inside the box.
Testing the Material as Kitchen Wrap
The applicability of the invention as cling film (kitchen wrap) was tested by a panel of five persons. The test was done as follows.
20 reels (30 meter each) of the film of the example 1 were put in the box.
As comparative example, 20 cling film reels from the market were purchased packed in the original box packing (including a cutting unit).
The practicality of the films was compared.
The reels of the films of the invention were removed from the box by opening the flip-flap at the side. Then the film was manually cut by the user without using any cutting unit.
In contrast to this, for the commercial films the box there are sold in was opened and the films were unrolled from the original box and cut using the cutting unit implemented in said box. When the commercial film was just removed from the box(without any cutting) and the user tried to cut it manually, it was not easy to tear and the panel members rejected it as not practical.
All five of the panel members concluded that the invention concept is more practical and user-friendly than the commercial (comparative) sample. Further the risk of injury is minimized.

What is claimed is:
1. A plastic film for cling film application, comprising a polyolefin and a polymer with Young's modulus higher than 500 MPa, wherein the film is packed in a box which does not comprise any cutting unit, wherein the film comprises an inner layer and an outer layer, wherein the outer layer is free of polypropylene;
wherein the polymer with Young's modulus higher than 500 MPa is selected from the group consisting of ethylene vinyl alcohol (EVOH), polyamide, polyester, cyclic olefin copolymer, polypropylene, polylactide (PLA), and combinations thereof;
wherein the polyolefin is selected from the group consisting of low-density polyethylene (LDPE), linear low-density polyethylene (LLDPE), metallocene LLDPE, polyolefin plastomer, ethylene vinyl acetate (EVA), ethylene methyl acrylate (EMA), ethylene butyl acrylate (EBA), polypropylene (PP), cyclic olefin copolymer, and combinations thereof; and
wherein the film is configured to be manually cut by a user without using any cutting unit.
2. The plastic film according to claim 1, wherein the film has a thickness of less than 25 microns.
3. The plastic film according to claim 2, wherein the film has a thickness of less than 20 microns.
4. The plastic film according to claim 2, wherein the film has a thickness of less than 18 microns.
5. The plastic film according to claim 2, wherein the film has a thickness of less than 17 microns.
6. The plastic film according to claim 2, wherein the film has a thickness of less than 15 microns.
7. The plastic film according to claim 1, wherein the film is wound up on a reel.
8. The plastic film according to claim 7, wherein the reel is made of paper or plastic.
9. A box which does not comprise any cutting unit, comprising a plastic film for cling film application, said plastic film comprising a polyolefin and a polymer with Young's modulus higher than 500 MPa, wherein the film comprises an inner layer and an outer layer, wherein the outer layer is free of polypropylene;
wherein the polymer with Young's modulus higher than 500 MPa is selected from the group consisting of ethylene vinyl alcohol (EVOH), polyamide, polyester, cyclic olefin copolymer, polypropylene, polylactide (PLA), and combinations thereof;
wherein the polyolefin is selected from the group consisting of low-density polyethylene (LDPE), linear low-density polyethylene (LLDPE), metallocene LLDPE, polyolefin plastomer, ethylene vinyl acetate (EVA), ethylene methyl acrylate (EMA), ethylene butyl acrylate (EBA), polypropylene (PP), cyclic olefin copolymer, and combinations thereof; and
wherein the film is configured to be manually cut by a user without using any cutting unit.
10. A method of packing a film, the method comprising providing a film comprising a polyolefin and a polymer with Young's modulus higher than 500 MPa, and packing the film into a box, wherein the film comprises an inner layer and an outer layer, wherein the outer layer is free of polypropylene;
wherein the polymer with Young's modulus higher than 500 MPa is selected from the group consisting of ethylene vinyl alcohol (EVOH), polyamide, polyester, cyclic olefin copolymer, polypropylene, polylactide (PLA), and combinations thereof; and
wherein the polyolefin is selected from the group consisting of low-density polyethylene (LDPE), linear low-density polyethylene (LLDPE), metallocene LLDPE, polyolefin plastomer, ethylene vinyl acetate (EVA), ethylene methyl acrylate (EMA), ethylene butyl acrylate (EBA), polypropylene (PP), cyclic olefin copolymer, and combinations thereof; and
wherein the film is configured to be manually cut by a user without using any cutting unit.
11. A method of storing a film in a box, the method comprising providing a film comprising a polyolefin and a polymer with Young's modulus higher than 500 MPa; and storing the film in a box, wherein the film comprises an inner layer and an outer layer, wherein the outer layer is free of polypropylene;
wherein the polymer with Young's modulus higher than 500 MPa is selected from the group consisting of ethylene vinyl alcohol (EVOH), polyamide, polyester, cyclic olefin copolymer, polypropylene, polylactide (PLA), and combinations thereof; and wherein the polyolefin is selected from the group consisting of low-density polyethylene (LDPE), linear low-density polyethylene (LLDPE), metallocene LLDPE, polyolefin plastomer, ethylene vinyl acetate (EVA), ethylene methyl acrylate (EMA), ethylene butyl acrylate (EBA), polypropylene (PP), cyclic olefin copolymer, and combinations thereof; and wherein the film is configured to be manually cut by a user without using any cutting unit.

* * * * *